June 23, 1925.  
H. P. HANSEN  
FISHING DEVICE  
Filed Feb. 23, 1924
1,543,081
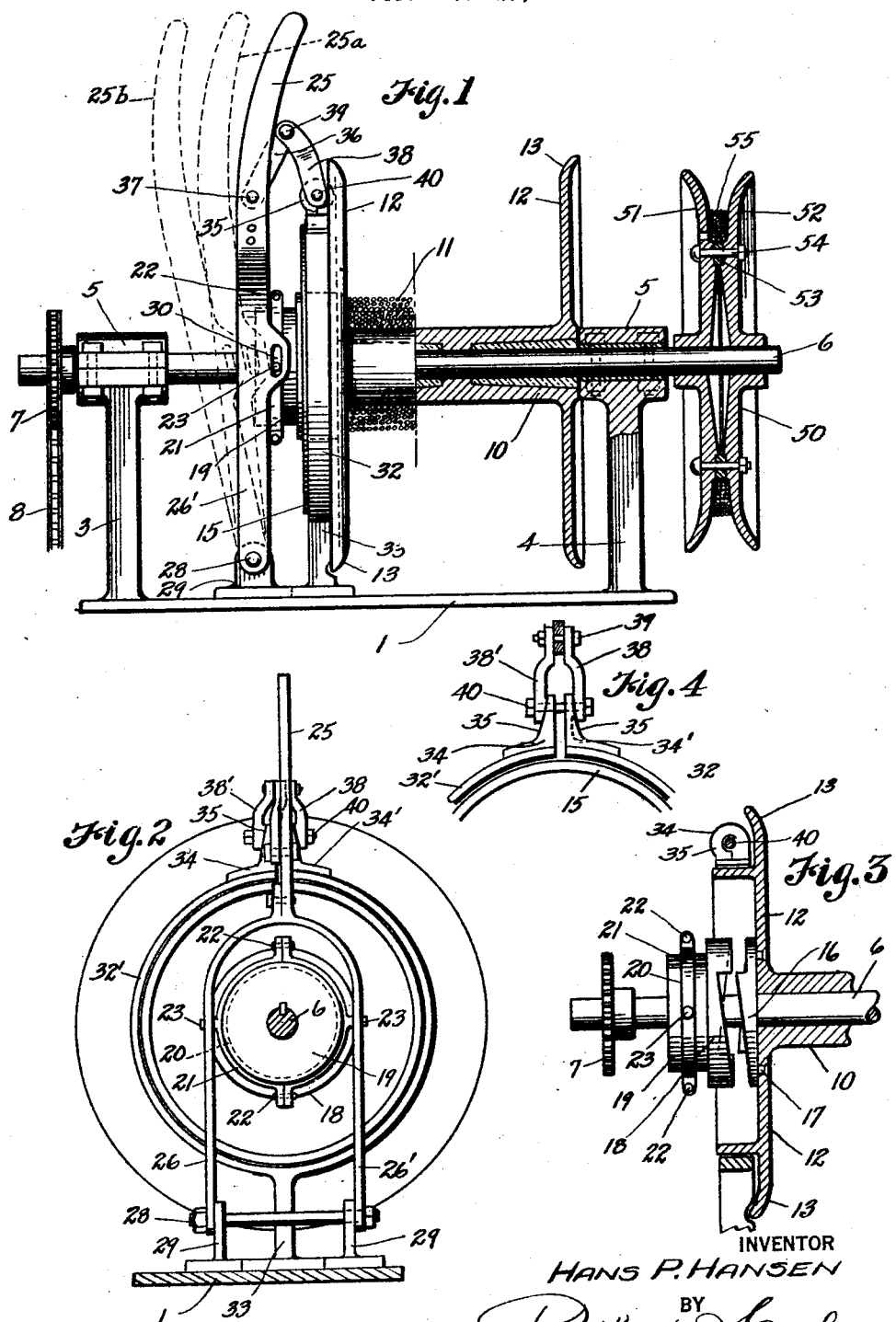
INVENTOR  
HANS P. HANSEN  
BY  
Richard J. Cook  
ATTORNEY Patented June 23, 1925.

1,543,081

UNITED STATES PATENT OFFICE.

HANS P. HANSEN, OF KETCHIKAN, TERRITORY OF ALASKA.

FISHING DEVICE.

Application filed February 23, 1924. Serial No. 694,604.

*To all whom it may concern:*

Be it known that I, HANS P. HANSEN, a citizen of the United States, and a resident of Ketchikan, Territory of Alaska, have invented certain new and useful Improvements in Fishing Devices, of which the following is a specification.

This invention relates to improvements in fishing devices, and more particularly to gurdies, or reels especially adapted to be used in trolling for salmon or halibut.

It is the principal object of this invention to provide an improved type of device for the above stated purpose that may be mounted upon the deck of a motor fishing boat and which is equipped with means whereby it may be operated from the propeller shaft of the boat or by other suitable driving connection with the motor which operates the boat.

Another object of the invention is to provide a fishing device comprising a driven shaft whereon a reel is mounted for axial rotation and whereon the fishing line is wound, and to provide a clutch and brake mechanism with a single control for both which may be adjusted to different positions to effect winding of the reel, to release the drum to permit its free rotation during paying out of the line, or to release the driving connection and to set the brake to hold the reel against rotation.

Other objects of the invention reside in the various details of construction, and combination of parts embodied in the device and in its mode of operation.

In accomplishing these and other objects of the invention, I have provided the improved details of construction, the preferred forms of which are illustrated in the accompanying drawings, wherein—

Figure 1 is a side elevation, partly in longitudinal section, of a fishing device constructed in accordance with the present invention.

Figure 2 is an end view of the same.

Figure 3 is a detail view illustrating the clutch mechanism.

Figure 4 is a detail view showing the brake setting and releasing members.

Referring more in detail to the several views of the drawings—

1 designates a base plate, suitable for attachment by bolts, or other devices, to the deck or rail of a fishing boat, and on which are two vertical standards 3 and 4 equipped with bearings 5 at their upper ends wherein a horizontal shaft 6 is rotatably contained. This shaft is equipped with a sprocket 7 over which chain 8 operates to drive the shaft; the chain being extended about a suitable driving member, not shown, which may be on the propeller shaft of the boat or any other driven member.

Mounted for axial rotation on the shaft 6 is a reel or drum 10, on which a fishing line 11 is wound. The end flanges 12 of the reel are curved, or flared outwardly about their edges, as at 13 so as to make easier winding in or paying out of the line. On the outer face of one of the end flanges is a brake drum or flange 15 and within this, concentrically about the shaft, is a clutch plate 16 secured by bolts 17 to the reel.

Keyed for longitudinal shifting on the shaft toward and from clutch plate 16 is a complemental clutch head 18 provided on its outer face with a cylindrical extension 19 having an annular groove 20 therein in which a ring 21 is slidably fitted. This ring preferably consists of two sections bolted together at their ends, as at 22, and which are provided, at opposite sides of the shaft, with extending trunnions 23. This clutch head is shifted into and from contact with clutch plate 16 by means of a lever 25 which connects with or extends from a yoke that comprises legs 26 and 26' that extend downwardly on opposite sides of the extension 19 and are pivotally attached by a bolt 18 to brackets 29 on the base plate. In the legs 26—26' are vertical slots 30 onto which the trunnions 23 extend and whereby a connection between the shifting lever and clutch is effected.

Extended about the drum flange 15 are brake bands 32 and 32', connected at their lower ends to a standard 33 that is secured to the base plate directly below shaft 6. These bands extend upwardly about opposite sides of the drum and at their adjacent ends, at the top of the brake drum are equipped with shoes 34—34', the outer faces of which are provided with cam surfaces, as at 35.

A toggle mechanism, comprising the link 36 that is pivotally connected by bolt 37 with lever 25, and a pair of links 38—38' pivotally connected by bolt 39 to outer end of link 36 and by bolt 40 to cam shoes 34—34' provides a connection whereby the brake bands are drawn into and from holding relation with the brake drum accordingly as the clutch head is shifted from and into driving relation with clutch plate 16. The links 38—38' are provided on their inner faces with cam faces engaged with cam surfaces 35 and the toggle connection is such that when the lever 25 is moved inwardly to the position in which it is shown in full lines in Figure 1, the relation of the cams is such that the brake bands will be released from the drum and it can rotate freely. The clutch parts are, however, in driving contact at this time and the reel will rotate with the shaft 6.

The construction provides further that, when lever 25 is shifted outwardly to position indicated in dotted lines, at $25^a$, the clutch connection will be released and the reel is free to rotate on the shaft 6. A farther outward shifting of the lever, to position, $25^b$ in dotted lines in Figure 1, causes cam mechanism of the toggle links 36 and brake shoes 34 to tighten or set the brake bands to hold the reel against rotation.

As an auxiliary device for halibut fishing, I have provided a reel 50 on the outer end of shaft 6. This comprises two opposite face plates 51 and 52 between which is interposed a spacing ring 53. Bolts 54 extend through the parts to hold them in assembled relation. This reel is of larger diameter than reel 10 in order that a faster winding in of the line 55 thereon can be effected. By inserting rings 53 of various widths, a reel of a desired width to suit the line in use, can be made.

With the device so constructed and connected with a driving shaft, if the operator wishes to pay out the line, he shifts lever 25 to position $25^a$, at which position the clutch and brake are both released and the reel is permitted to freely unwind. When it is desired to set the reel against farther unwinding, the lever is moved to position $25^b$ at which position the toggle mechanism is caused to clamp the brake bands against the brake drum and hold the reel. When it is desired to wind in the line, the lever is shifted to its inner position thereby releasing the brake and engaging the clutch members so that a driving connection between shaft 6 and reel 10 is made and the reel caused to rotate.

It is readily apparent that such devices can be made in sizes suitable for their purpose and that one or more reels could be moved on the same driving shaft which could be driven in any suitable manner otherwise than here illustrated.

Having thus described my invention, what I claim as new therein and desire to secure by Letters-Patent, is:

A device of the class described comprising a mounting base, standards on said base, a shaft rotatable in the standards, a reel rotatable on the shaft, a clutch plate on the end of the reel, a brake drum on the reel, a pair of brake bands supported from the base and extended about the brake drum and having cam shoes at their ends, a clutch head slidably keyed to the shaft, a lever pivotally fixed to the base and operably connected to said clutch head to shift it into and from driving connection with the clutch plate on the reel, and a toggle mechanism connected with the lever and said cam shoes whereby the brake may be set when the lever is shifted to move the clutch head to its outer released position.

Signed at Seattle, King County, Washington this 18th day of December 1923.

HANS P. HANSEN.